A. S. HART.
Steam Radiator.
No. 41,619. Patented Feb. 16, 1864.
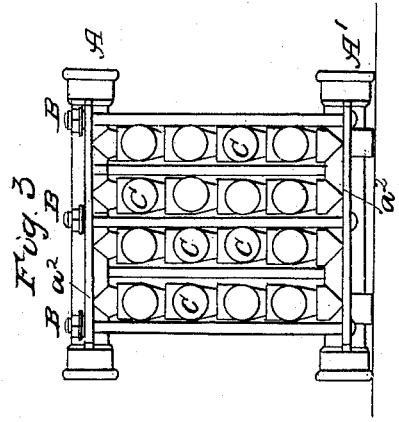
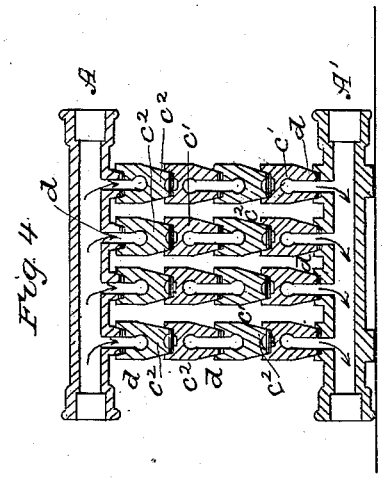
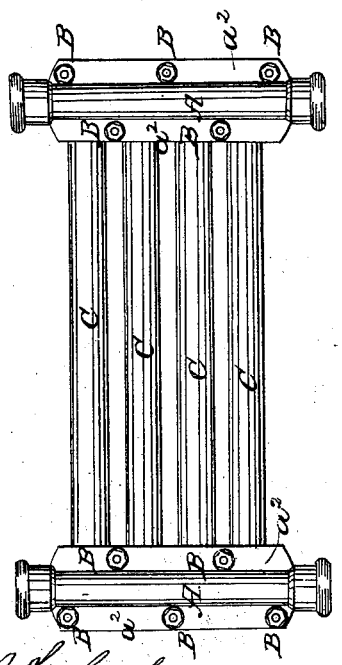
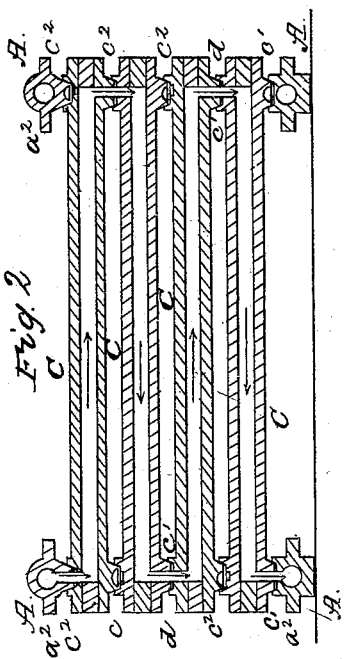
Witnesses:
E. B. Forbush
Geo. W. Wallace
Austin S. Hart
Inventor

UNITED STATES PATENT OFFICE.

AUSTIN S. HART, OF BUFFALO, NEW YORK.

IMPROVEMENT IN STEAM-RADIATORS.

Specification forming part of Letters Patent No. 41,619, dated February 16, 1864.

*To all whom it may concern:*

Be it known that I, AUSTIN S. HART, of the city of Buffalo and State of New York, have invented certain new and useful improvements in the connection of metallic pipes arranged in stacks for heating buildings with hot water or steam; and I do hereby declare that the following is a full, clear, and exact description thereof, reference being had to the accompanying drawings, making part of this specification, in which—

Figure 1 is a top plan of the pipes. Fig. 2 is a longitudinal horizontal section through the upper tier of pipes. Fig. 3 is an end elevation of the stack. Fig. 4 is a transverse section of the same.

The nature of this invention relates to a new mode of constructing cast pipes at their joints or connections in order that straight pipes may be used and laid up into a stack for heating buildings with hot water, and thereby secure greater economy and convenience in the construction of the pipes and in the laying up of the stack, and so as to insure a more perfect, convenient, and safe connection of the several pipes with each other.

A represents the main ingress and A' the egress pipe, which also form cross-heads for holding the stack in place. They are cast with flanges or rims $a^2$ to admit bolts B, which pass through these flanges and between the tiers of pipes, as shown in Figs. 1 and 3, and bind and hold the several tiers of pipes firmly and closely together.

C represents a single pipe, the peculiar form of which at the joint or connection is clearly shown in Fig. 2. It will be noticed that a joint projection is cast near the end of each pipe on opposite sides and at right angles thereto, as shown at C'. Each alternate projection is "stopped off" or made solid, as shown at $c^2$, so that there will be a continuous current of water through the pipes of each tier, as shown by the course of the arrows in Fig. 2. One projection fits into the other, with a rubber packing between, so as to form a water-tight joint. The rubber packing is shown at $d$. The joint formed by the solid or non-tubular projections also has rubber packing in order to compensate for the packing in the tubular ends, so that when the pipes are laid up in the stack the bolts will draw upon them equally and insure a perfect joint.

Advantages: The pipes forming the stack are all alike, and may be cast from the same pattern. They are easily and cheaply cast, and are laid up in the stack with great facility. One man can easily lay up the stack with these pipes. The joints are more easily and cheaply formed than the joints in ordinary coils, and in case a pipe becomes broken or defective it can be easily taken out of the stack and a new one put in. As heating-coils are usually constructed it takes two or three men to lay them up. With this improvement one man can easily lay up the stack or make any repairs thereto. These stacks are properly placed in brick-work for heating buildings with hot water, as is common in like cases. The upper cross-head connects with the upper part of the boiler, and the lower cross-head connects with the bottom of the boiler, so that a constant circulation of water is kept up through the boiler and through the pipes forming the stack. The ends of the pipes forming the cross-heads not used for the ingress nor egress of the water will be plugged when the stack is put up.

What I claim as my invention, and desire to secure by Letters Patent, is—

The cast pipes C, having a projection, C', near each end and on opposite sides, each alternate projection being stopped off or made solid, so that when the pipes are laid up in a stack there will be a good joint connection formed at these projections, and a continuous current of water or steam caused to flow from the boiler through each tier of pipes, for the purposes and substantially as described.

AUSTIN S. HART.

Witnesses:
GEO. W. WALLACE,
E. B. FORBUSH.